United States Patent

[11] 3,611,180

[72] Inventor  Marvin E. Lasser
                Potomac, Md.
[21] Appl. No. 725,976
[22] Filed     May 2, 1968
[45] Patented  Oct. 5, 1971
[73] Assignee  Philco-Ford Corporation
                Philadelphia, Pa.

[54] COHERENT FAR INFRARED GENERATOR
     4 Claims, 2 Drawing Figs.
[52] U.S. Cl. .................................... 331/94.5,
                                                  317/234
[51] Int. Cl. .................................... H01s 3/18
[50] Field of Search ........................... 331/94.5;
                                                317/235 (27)

[56]             References Cited
           UNITED STATES PATENTS
3,059,117  10/1962  Boyle et al. ................... 331/94.5

3,305,685  2/1967   Shyh Wang .................. 331/94.5 X
3,412,344  11/1968  Pankove ...................... 331/94.5
3,445,786  5/1969   Snyder et al. ................ 331/94.5

OTHER REFERENCES
Dean et al.: Physical Review, vol. 161, pp. 711– 29, Sept. 15, 1967

Melngailes et al.: Applied Physics Letters, vol. 5, pp. 99– 100, Sept. 1, 1964

Primary Examiner—Ronald L. Wibert
Assistant Examiner—Edward S. Bauer
Attorney—Robert D. Sanborn ABSTRACT: Coherent far infrared generator comprising solid state laser using supercooled doped semiconductor crystal pumped by impact ionization to create population inversion of impurity charge carriers from valence level to higher energy level within forbidden band.

PATENTED OCT 5 1971
3,611,180
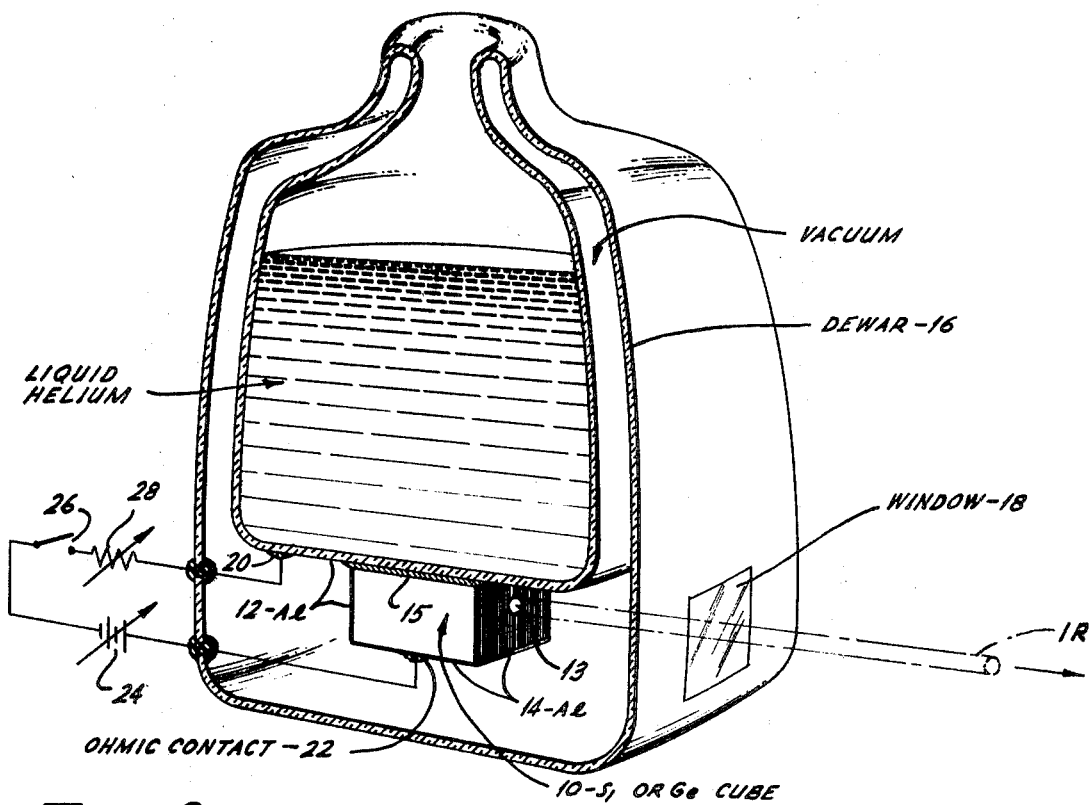
FIG. 2. LASER SYSTEM
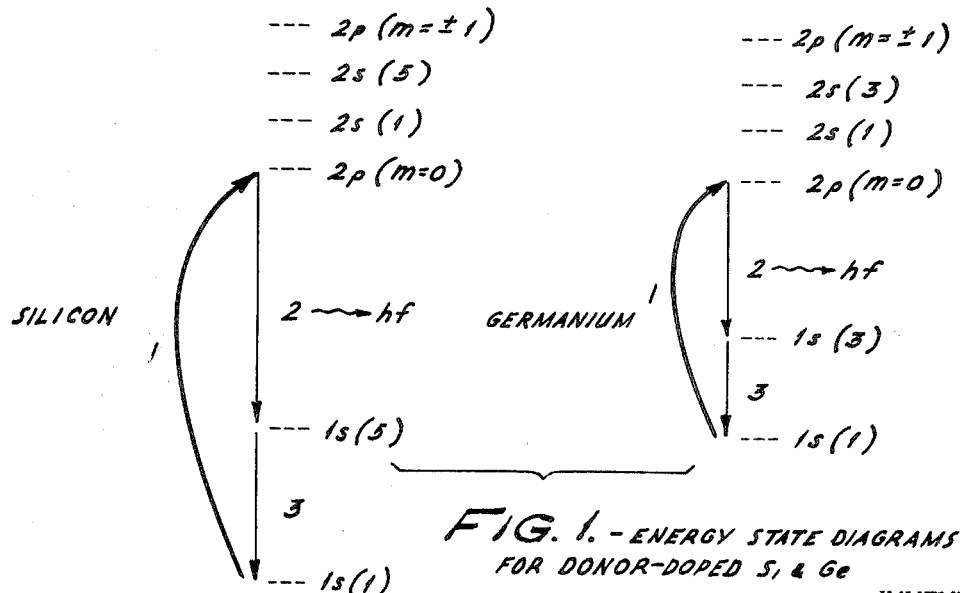
FIG. 1.—ENERGY STATE DIAGRAMS FOR DONOR-DOPED Si & Ge
INVENTOR.
MARVIN E. LASSER
DR Pressman
ATTORNEY

COHERENT FAR INFRARED GENERATOR

This invention relates to a far infrared radiation generator employing a unique type of solid state laser.

A need exists for a satisfactory means of generating coherent radiation in the far infrared (IR) portion of the electromagnetic spectrum, i.e., from about 30 to 300 microns wavelength radiation. This portion of the spectrum, heretofore largely unexplored, has great potential utility in communications and other fields in which lasers have now become useful.

Heretofore generators of far IR radiation have been able to provide only very low power and noncoherent outputs. The now conventional techniques used to provide coherent radiation in the visible or near IR ranges cannot be adapted to provide coherent radiators with far IR capability because of an inherent incapability to provide a short enough energy level traverse.

Accordingly, several objects of the present invention are: (1) to provide a generator of coherent far IR radiation, (2) to provide a coherent far IR generator which uses a novel principle of operation, and (3) to provide a new and improved solid state laser. Other objects and advantages of the present invention will become apparent from a consideration of the ensuing description thereof.

SUMMARY

According to the present invention, coherent radiation in the far infrared region is produced by pumping the energy state of charge carriers of an impurity within a supercooled semiconductor resonant cavity from an impurity level to a higher level within the forbidden region so that relaxation of the charge carriers can be triggered in a coherent manner by radiation, whereby the excited charge carriers will fall to an intermediate level and the desired radiation will be emitted. Pumping is desirably accomplished by supplying an electric field across the semiconductor to create impact ionization therein, which distributes energy quanta to the impurity atoms to raise the energy state of the electrons therein. The semiconductor resonant cavity is desirably in the form of a cube which has reflective opposing faces, with one reflective face containing a window to permit a portion of the radiation to exit.

DRAWINGS

FIG. 1 shows energy level diagrams for donor impurity doped silicon and germanium crystals.

FIG. 2 is a diagram of a solid state far infrared laser system according to a preferred embodiment of the present invention.

GENERAL BACKGROUND

Radiation in the far IR region is generated in the present invention by causing electrons to fall through an energy gap which is relatively small in relation to the gap used in visible and near IR coherent generators. For generating 240 microns wavelength radiation, the energy gap is about 5 mev. (millielectron volts); and for 60 microns wavelength radiation, the energy gap is about 20 mev. The electrons are made to fall through this energy gap by creating a population inversion of impurity center energy states from a quiescent, lower energy level, to an excited, higher energy level. Spontaneously appearing light photons of the proper wavelength in the cavity will trigger coherent energy level drops to a lower state, which will cause the emission of coherent far IR radiation.

In order for radiation to be emitted from a laser cavity, enough energy must be supplied thereto in the form of appropriate pumping until the number of inverted (high energy) charge carriers per unit volume of the laser cavity exceeds a predetermined threshold. This threshold density, $D$, is computed according to the formula $D=\pi/2 \cdot 8\pi f^2 G/C^3 \cdot S/T$ where $D$ is measured in states/cm.$^3$, $f$ is the radiation frequency of interest, $G$ is the bandwidth of spontaneous laser emission under the threshold oscillation conditions, $S$ is the spontaneous (average) lifetime of a carrier in the high-energy state, $T$ is the average lifetime of a phonon in the laser cavity, and $C$ is the speed of light. In the preferred embodiment, a 50 micron laser using a silicon crystal lattice doped with arsenic, $G$ is about 0.4 mev., $S$ is about $10^{15}$ sec, and $T$ is about $10^{19}$ sec. The resultant threshold density $D$ is about $10^{10}$ charge carriers per cm.$^3$, which is less than that required for efficient crystalline laser sources (2–5 ×$10^{15}$ cc./cm.$^3$) and more than that required for a typical gas laser (2×$10^7$ cc./cm.$^3$).

At threshold, the fluorescent output power of the system, $R$ is given by the formula $R=Dhf/s$ where $h$ is Planck's constant. Under the conditions above, $R$ is equal to about 3×$10^{16}$ watts/cm.$^3$, which compares with 10 watts/cm.$^3$ for solid state crystalline lasers and $10^{16}$ watts/cm.$^3$ for a 1 micron HE-NE gas laser. Thus a solid state laser according to the present invention which has dimensions of 1 ×0.1 ×.1 cm would supply an output power of about $10^{18}$ watts at threshold; this value can readily be detected with relatively insensitive long wavelength IR detectors.

The minimum pump power required to produce the threshold inversion density is determined by the magnitude of the threshold density and the average carrier lifetime in the excited state. This lifetime is determined by both the phonon and photon lifetimes; for an arsenic doped silicon source these lifetimes are comparable. The pumping source must of course have a quantum energy higher than that of the radiation; for 60–240 microns radiation (20 to 5 mev.), the order of magnitude for the quantum pump energy will be about 100 mev. From these figures it can be shown that the minimum pump power (for threshold operation) is about 3×$10^{15}$ watts/cm.$^3$. The efficiency at this threshold level of operation is about 10 percent, but at higher levels this value increases due to the decrease in radiative lifetime which allows a greater proportion of pump power to produce radiative transitions.

The size of the resonant cavity required to produce laser action is more critical in the far IR range than in the near IR or visible ranges. The minimum cavity length $M$ to produce laser action is given by the formula $M=c/2NG$ where $N$ is optical index of the host material. For a silicon semiconductor, $N=3$ so that for a typical bandwidth, $10^{11}$ Hz. $M$ is 50 mm. The minimum cross-sectional cavity area $A$ is governed by diffraction considerations, which require that $A>NWM$ where $W$ is the wavelength of the radiation. Thus $A$ must be greater than $10^{13}$cm.$^2$. The length of the cavity can theoretically be adjusted for a resonant condition at the center frequency of the fluorescent bandwidth, in which case the exact cavity length $L$ is governed by the formula $L=nW/2N$ where $n$ is an integer. In practice it is quite difficult to obtain a device having exactly this dimension due to the small value of $W$. Thus the length and cross-sectional area of the preferred embodiment of the solid state laser cavity greatly exceeds these minimum dimensions so that many modes will exist in the vicinity of the center of the spectral line.

The bandwidth of the radiated spectrum, $J$, which is inversely proportional to the $Q$ of the laser cavity, can be calculated from the formula $J=8\pi hf/PT^2$ where $P$ is the radiated power and $T$ is assumed to be $10^{19}$ sec. A power level well above threshold level, i.e., about 3×$10^{16}$ watts, will produce a radiated bandwidth of $10^4$ Hz. This is wider than the bandwidth of good gas lasers (about 1 Hz. but is comparable to the bandwidth of other crystalline laser materials.

The impurity energy level diagrams for silicon and germanium crystals doped with a donor such as arsenic are shown in FIG. 1. While the invention is discussed with reference to the use of a donor impurity dopant such as arsenic, phosphorus, or antimony, it is equally applicable to the use of an acceptor impurity such as boron. The energy levels for donors are all within the forbidden band, close to the conduction band. At sufficiently low temperatures (10–15° K. for Si and below 4° K. for Ge) the donor electrons are frozen out in the lowermost (minimum energy) 1s(1) state. By the introduction of energy quanta through appropriate pumping (discussed infra), the electrons can be raised along path 1 to the 2p(m=0) state to create a population inversion between this state and the next lower (intermediate) state (the 1s(5) state in silicon and 1s(3) state in germanium).

Upon triggered relaxation, the electrons will fall by way of path 2 to the intermediate state and thence to the lowermost 1s(1) state by way of path 3. The transition from the 2p(m=0) state to the intermediate state is mainly radiative (productive of photons) so that energy quanta $hf$ will be released to produce radiation of frequency $f$. In silicon doped with arsenic, the energy gap will be 20 mev., (about 60 microns radiation), while in germanium 1s(5) with arsenic the energy gap will be 5 mev. (about 240 microns radiation).

The subsequent transitions down to lowermost 1s(1) level will be mainly nonradiative (productive of phonons). These transitions will be lossy and mainly will produce lattice vibrations. Transitions which occur directly between the 2p(m(=) O) state and the 1s(1) state will also be nonradiative but generally will produce nonlossy energy quanta which will in turn produce subsequent high-energy states at the 2p(m(=) 0) level. Excitation of carriers to levels other than the 2p(m=0) level represent losses but are not significant. Such excitations tend to populate the upper "S" states. Relaxation from these upper "S" states produces phonon emission which dominates photon emission by many order of magnitude.

Pumping is desirably achieved by impact ionization, a phenomenon which occurs when a sufficiently strong field is applied to a solid state material maintained at a low temperature and which produces moving free charge carriers which collide with atoms to create ions and other free charge carriers. In this process, energy quanta will be distributed, causing the aforedescribed pumping of electrons in the donor impurity to the 2p(m=0) state. The applied field should be sufficiently strong to produce about $10^9$ to $10^{10}$ free charge carriers/cm.$^3$. This density of free carriers is not sufficient to absorb enough of the generated photons to destroy the $Q$ of the cavity.

PREFERRED EMBODIMENT

A preferred embodiment of the invention is shown in FIG. 2. The laser cavity is a monocrystalline 1 cm. cube 10 of silicon or germanium doped with arsenic to about $10^{15}$ atoms per cc. Two opposing faces 12 and 14 of the cube are highly polished and extremely flat and are coated with reflective layers of aluminum, desirably by vacuum evaporation. The left-hand face 12 is completely covered with aluminum so that it is almost 100 percent reflective, while the right-hand face 14 has a small circular exit window 13 so that it is about 90 percent reflective.

Another face of the cube is soldered by means of an ohmic contact 15 to the bottom of the outer wall of the inner chamber of a dewar 16, which is shown in a sectional view. The inner chamber is filled with liquid helium to maintain the cube at a low temperature. The outer chamber of dewar 16 has a window 18 therein which is aligned with the exit window in face 14 so as to allow the IR radiation to leave the enclosure. Window 18 is formed of polymethyl methacrylate, polyethylene, or polystyrene, which are all substantially transparent to IR radiation.

A lead is bonded to the inner chamber of the dewar at 20 so as to provide a conductive connection to the face of the cube which is soldered to the dewar. Another lead is soldered to the opposite face of the cube at 22, providing an ohmic connection to that face. The two leads are brought out of the dewar through insulating feed throughs and are connected to an appropriate pumping source represented in FIG. 2 by an adjustable voltage source, an off-on switch 26, and a variable resistance 28. A voltmeter and ammeter (not shown) may also be connected to measure the current through and voltage across the cube.

The laser is operated by closing switch 26 and raising the voltage of battery 24 until impact ionization occurs. (When impact ionization occurs, at about 2 volts per cm., the resistance of the cube decreases sharply.) The current is adjusted by means of resistor 28 until desired lasering occurs. The presence of the long wavelength IR output can be detected by conventional means, such as a germanium bolometer or an indium-antimonide Putley detector.

Liquid helium is preferred as a refrigerant due to its low boiling temperature (4.2° K.). Liquid helium is required when germanium is used as the host material. Liquid hydrogen (10–15°) also can be used when cube 10 is silicon.

It should be noted that in the laser of the present invention the energy states of the charge carriers (holes or electrons) of an impurity within a semiconductive lattice are raised from the impurity level to a higher level near the conduction level. As the carriers are triggered back to an intermediate level, energy quanta in the far IR range are emitted. This operation contrasts with that of the conventional injection laser in which charge carriers traverse a semiconductive junction and cause carriers at the impurity level in the laser material to jump to the conduction band and provide characteristic radiation as they fall across the forbidden band to the valence band.

While there has been described what is at present considered to be the preferred embodiment of the invention it will be apparent that various modifications and other embodiments thereof will occur to those skilled in the art within the scope of the invention. Accordingly, it is described that the scope of the invention be limited by the appended claims only.

I claim:

1. A solid state laser for producing coherent infrared radiation having a wavelength in the range from about 30 microns to about 300 microns, comprising:
   a. a monocrystalline body of semiconductive material containing atoms of a significant impurity, said body being of only one conductivity type and having two substantially plane parallel faces, a first coating on one of said faces for substantially completely reflecting said infrared radiation, and a second coating on the other of said faces for partially transmitting and partially reflecting said infrared radiation, said two coatings bounding an optical cavity having a resonance at the wavelength of said infrared radiation, said body also having two opposed surface portions other than said two faces,
   b. means for maintaining said body at a temperature sufficiently low that, when no energy is applied to said body, substantially all of said impurity atoms therein are unionized, charge carriers of said impurity atoms being capable of existing at a given lower energy level and of being pumped to a given higher energy level below the conduction band of said material, the energy difference between said given lower energy level and said given higher energy level being substantially equal to that of a photon having a wavelength within said range, and
   c. means for pumping said body so as to cause a population inversion of said charge carriers of said impurity atoms from a lower energy level to said given higher energy level said inversion being of sufficient magnitude that emission of said coherent infrared radiation through said other face along a path transverse thereto occurs when some of said pumped charge carriers fall from said given higher energy level to said given lower energy level, said means for pumping comprising a first ohmic electrical connection to one of said two opposed surface portions of said body and a second ohmic electrical connection to the other of said two opposed surface portions of said body, and means for applying between said first connection and said second connection a voltage for establishing within said body an electric field transverse to said path of said coherent infrared radiation and of strength sufficient to cause said population inversion of sufficient magnitude.

2. The laser of claim 1 wherein said semiconductive material is silicon and said significant impurity is arsenic having a concentration in said body of about $10^{15}$ atoms per cubic centimeter.

3. The laser of claim 2, wherein said means for maintaining said body at said temperature comprises means for maintaining said body within a temperature range having a maximum temperature of about 15° K.

4. The laser of claim 1 wherein said semiconductive material is germanium.

PO-1050
(5/69)

UNITED STATES PATENT OFFICE
CERTIFICATE OF CORRECTION

Patent No. __3,611,180__  Dated __10/5/71__

Inventor(s) __Marvin E. Lasser__

It is certified that error appears in the above-identified patent and that said Letters Patent are hereby corrected as shown below:

Column 2, line 3: "$10^{15}$" should be --$10^{-5}$--

Column 2, line 3: "$10^{19}$" should be --$10^{-9}$--

Column 2, line 11: "$10^{16}$" should be --$10^{-6}$--

Column 2, line 12: "$10^{16}$" should be --$10^{-6}$--

Column 2, line 15: "$10^{18}$" should be --$10^{-8}$--

Column 2, line 28: "$10^{15}$" should be --$10^{-5}$--

Column 2, line 43: "$10^{13}$" should be --$10^{-3}$--

Column 2, line 43: The sentence beginning "The length of the cavity . . ." should begin a new paragraph Column 2, line 56: "$10^{19}$" should be --$10^{-9}$--

Column 2, line 57: "$10^{16}$" should be --$10^{-6}$--

Column 2, line 59: A close-parentheses sign should be inserted after "Hz."

Column 3, line 11: "1s(5)" should be --doped--

Column 3, line 16: Parentheses enclosing the "equals" sign at the end of the line should be removed Column 3, line 19: Parentheses enclosing the "equals" sign should be removed Column 3, line 24: "order" should be --orders--

Signed and sealed this 16th day of May 1972.

(SEAL)
Attest:

EDWARD M. FLETCHER, JR.
Attesting Officer

ROBERT GOTTSCHALK
Commissioner of Patents